Oct. 11, 1927.

A. MOORHOUSE

MOTOR VEHICLE

Filed Oct. 9, 1925

1,645,342

Inventor

Alfred Moorhouse

By Milton Tibbetts

Attorney

Patented Oct. 11, 1927.

1,645,342

UNITED STATES PATENT OFFICE.

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed October 9, 1925. Serial No. 61,612.

This invention relates to motor vehicles and particularly to the gearing thereof.

In the conventional sliding gearing of a motor vehicle there is a splined or keyed shaft upon which one or more gears slide for making the changes in transmission speeds. These gears are fitted very nicely to the shaft but of course they must be free enough on the shaft to slide easily when shifting from one speed to another.

It has been found in practice that when the sliding gears are fitted loosely enough to insure freedom of movement for meshing the gears they will sometimes rattle or chatter when they are running idle, that is, when another speed is used such as the direct drive. This chatter will usually come in at certain speeds which synchronize with the vibratory period of the shaft or the gear and it causes objectionable noises.

One of the objects of the present invention is to provide means for reducing or eliminating the chatter or rattle of splined or keyed gears.

Another object of the invention is to provide a spring device between a splined shaft and its gears for the purpose of preventing the gear from rattling.

Other objects of the invention will appear from the following description taken in connection with the drawings, which form a part of this specification, and in which.

Figure 1:
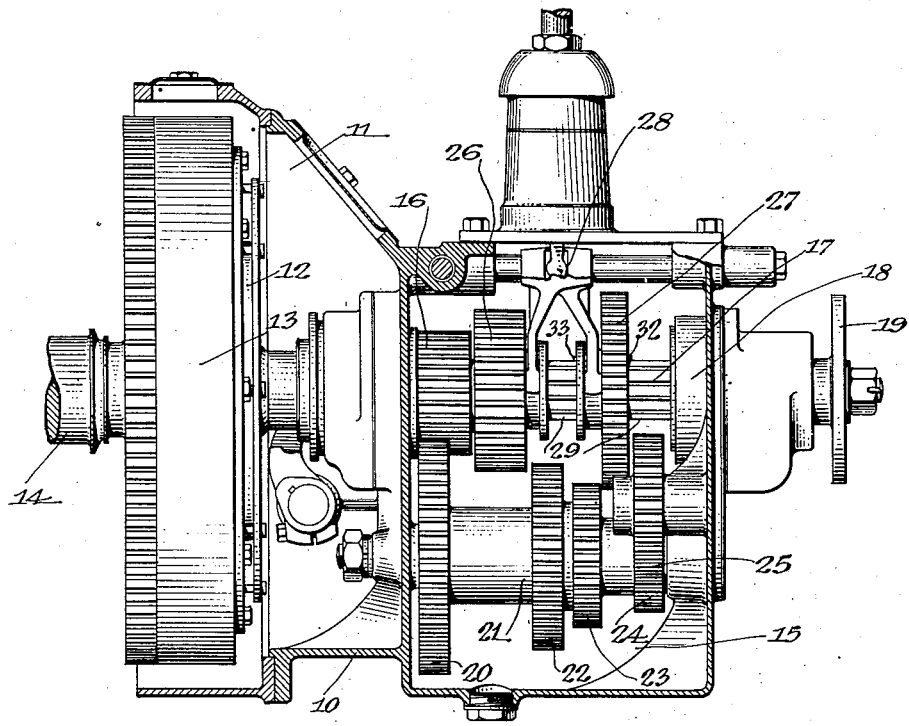
Fig. 1 is a sectional view through a motor vehicle transmission or gear box, with gears shown in elevation, embodying the invention.

Referring to the drawings, 10 represents the supporting casing for the clutch and transmission or gearing of a motor vehicle. This casing is shown as divided into two compartments, the left hand compartment 11 housing the clutch 12 and fly wheel 13, which latter is mounted on the engine crank shaft 14, and the right hand compartment 15 housing the gearing which is connected to the clutch through suitable shafting. A constant mesh gear 16 is secured to the driven shaft of the clutch and a spline shaft 17 has its forward end mounted for rotation in the gear 16 and its rear end mounted in a bearing 18 in the casing. The rear end of the shaft 17 has a flange 19 which connects with the universal joint and propeller shaft for driving the vehicle. Constant mesh gear 16 meshes with a gear 20 on a counter shaft 21 upon which there are also gears 22, 23 and 24. Another counter shaft supports a reverse idler gear 25 in constant mesh with gear 24.

On the spline shaft 17 there are two sliding gears or gear elements 26 and 27. The gear 26, in addition to having external teeth which are adapted to mesh with the gear 22 in one position of the gear elements, also has internal teeth which are adapted to mesh with the extension of the teeth of the gear 16 whereby the shaft of the gear 16 may be driven direct and at the same speed as the clutch shaft. The gear element 27 is adapted to mesh with the gear 23 when in one position and with the reverse gear 25 when in another position.

The sliding gear elements 26 and 27 may be moved to their various positions by gear shift mechanism indicated generally at 28.

Figures 2, 3:
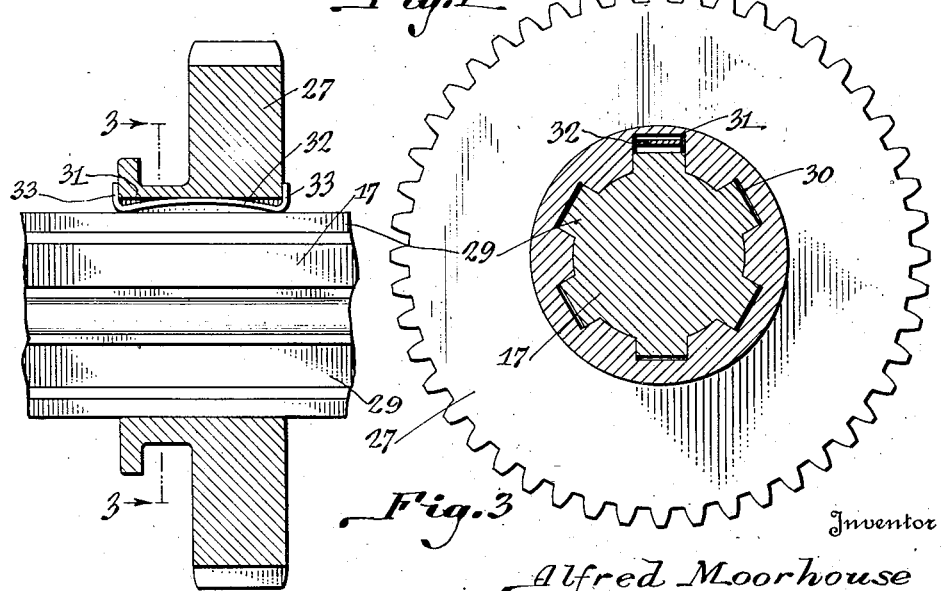
Fig. 2 is an enlarged sectional view through one of the sliding gears of the gear box shown in Fig. 1, together with a portion of the splined shaft on which the gear slides.
Fig. 3 is a transverse section on the line 3—3 of Fig. 2.

In Fig. 1 the gears are shown in neutral position. By moving the gear element 26 to the left it will be in direct drive position, and when the mechanism is in that position and the engine is driven at certain speeds, it is found that the gear element 27 will sometimes rattle or chatter on its shaft. To reduce or prevent this rattle, means are provided for giving a slight lateral thrust to the gear on its shaft. In Fig. 2 the gear element 27 is shown on its spline shaft 17. Said shaft is formed with integral keys or splines 29, and the gear is shown as formed with key-ways or spline-ways 30 which fit the splines of the shaft. One of these spline-ways is cut deeper than the others as shown at 31 so that there is a space between the top of the spline 29 and the bottom of the spline-way. In this space is arranged a plate spring 32 which is slightly bowed as shown in Fig. 2, and is formed at its ends with flanges 33. In other words, the plate spring 32 has its ends 33 turned at right angle so that they may form stops to prevent the displacement of the spring as the gear is moved on its shaft.

By this arrangement of the spring, the gear 27 is pressed laterally on the shaft and all play or looseness is taken out so that the gear cannot rattle in its shaft.

In assembling the gear and spring it is obvious the spring will be assembled in the deep spline-way of the gear and the gear will then be assembled on the shaft by slightly compressing the bow in the spring 32.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. In a motor vehicle, the combination of a shaft, a gear thereon, and a spring between the shaft and the bore of the gear, for preventing rattle of the gear on the shaft.

2. In a motor vehicle, the combination of a splined shaft, a sliding gear thereon, and a spring between the shaft and gear having a plural bearing upon the shaft.

3. In gearing, the combination of a splined shaft, a gear sliding thereon, and a spring between one of the splines and the gear for pressing the gear laterally and uniformly on the shaft.

4. In gearing, the combination of a splined shaft, a gear sliding thereon, and a spring between one of the splines and the gear tending to prevent rattle.

5. In gearing, the combination of a shaft having a key, a gear on the shaft and formed with a key-way to receive the key of the shaft, there being a space between the top of the key and the gear, and a spring in said space.

6. In gearing, the combination of a shaft having a key, a gear on the shaft and formed with a key-way to receive the key of the shaft, there being a space between the top of the key and the gear, and a plate spring extending lengthwise of the shaft and arranged in said space to press the gear laterally relative to the shaft.

7. In gearing, the combination of a splined shaft, a gear adapted to slide on said shaft, said gear having one of its spline-ways cut deeper than the corresponding spline of the shaft, and a spring in said deeper spline-way.

8. In gearing, the combination of a splined shaft, a gear adapted to slide on said shaft, said gear having one of its spline-ways cut deeper than the corresponding spline of the shaft, and a plate spring in said spline-way pressing against the gear and the top of the spline and having turned up ends to retain it in place.

In testimony whereof I affix my signature.

ALFRED MOORHOUSE.